Figure 4:
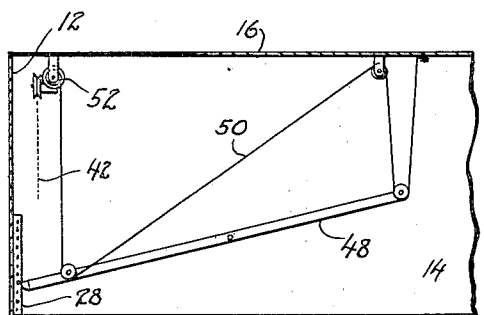

Nov. 22, 1938.     W. J. NIGHTINGALE     2,137,981
AUTOMOBILE LOADING DEVICE
Filed Feb. 29, 1936     6 Sheets-Sheet 1
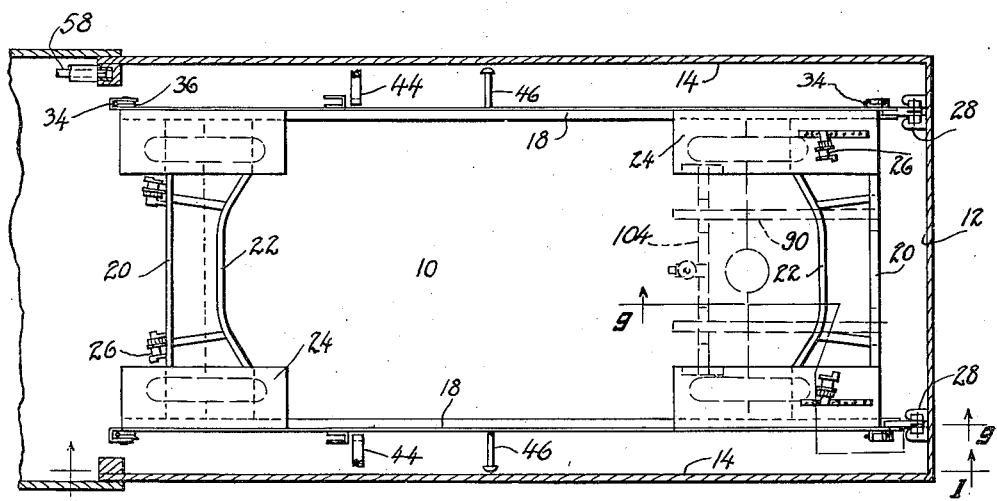
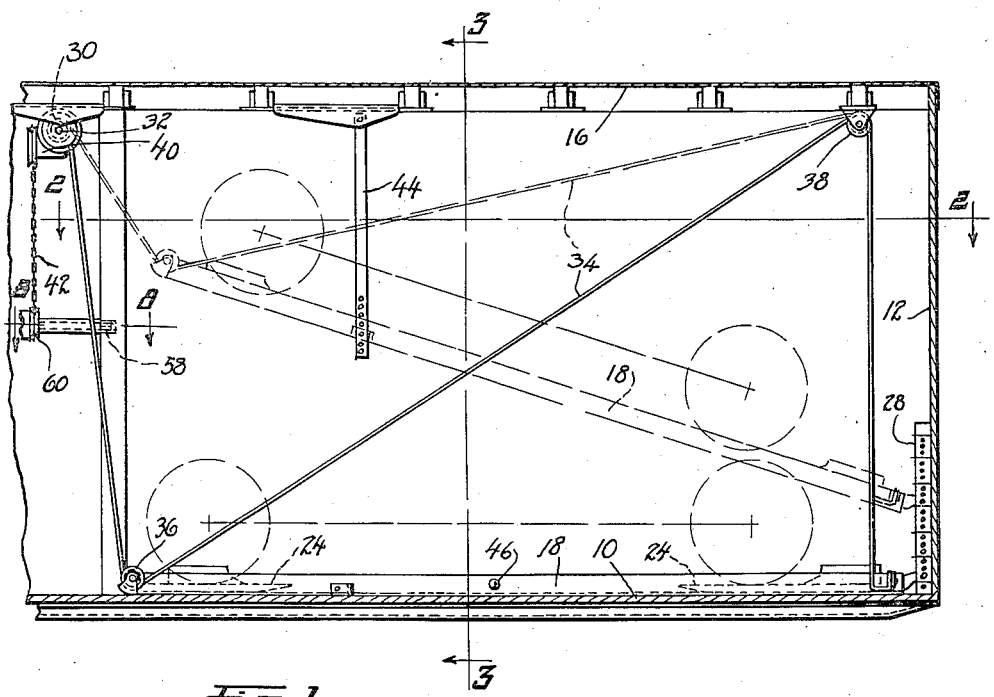
INVENTOR.
William J. Nightingale
BY
Parker & Reston
ATTORNEYS INVENTOR.
William J. Nightingale
BY Parker & Burton
ATTORNEYS.

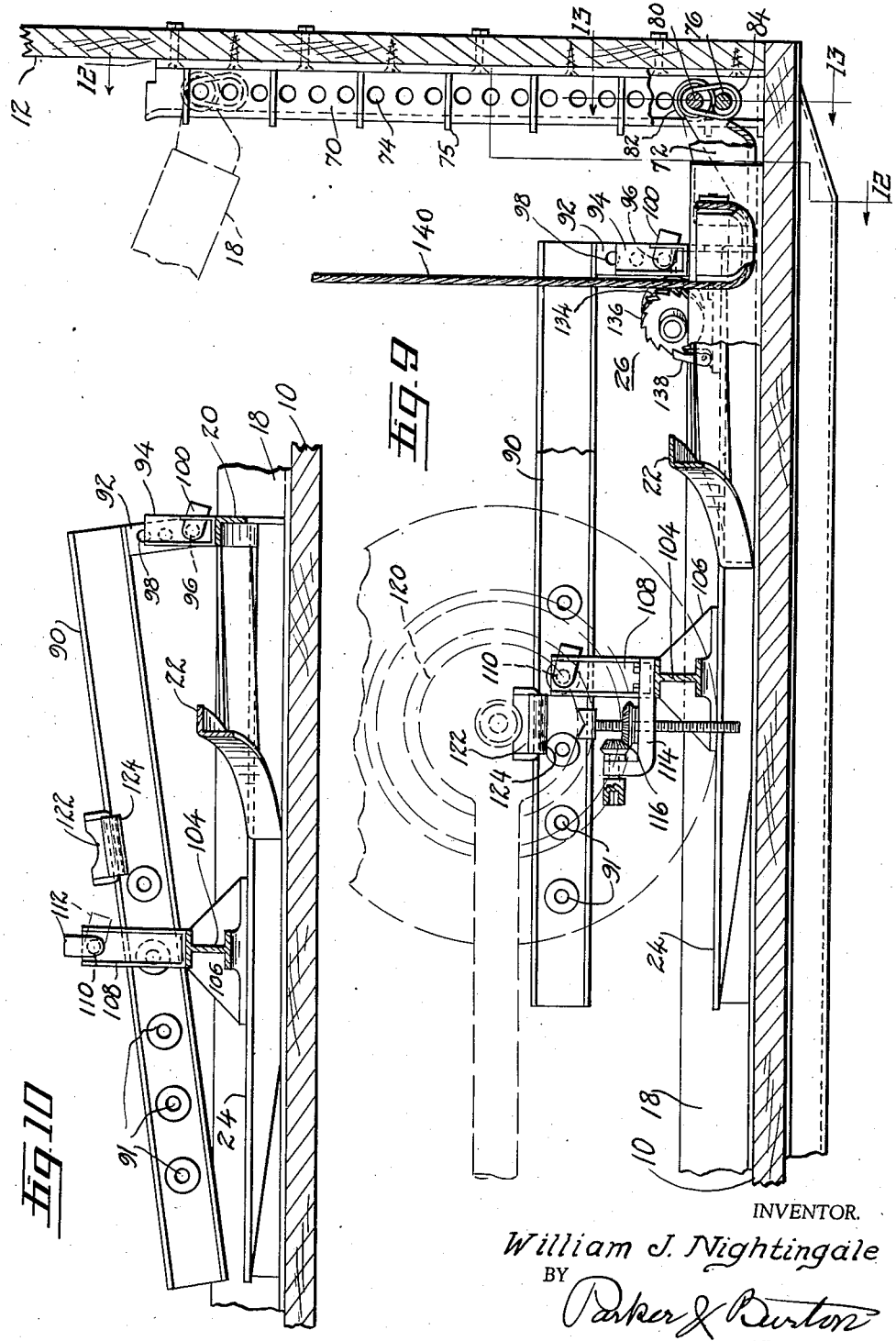

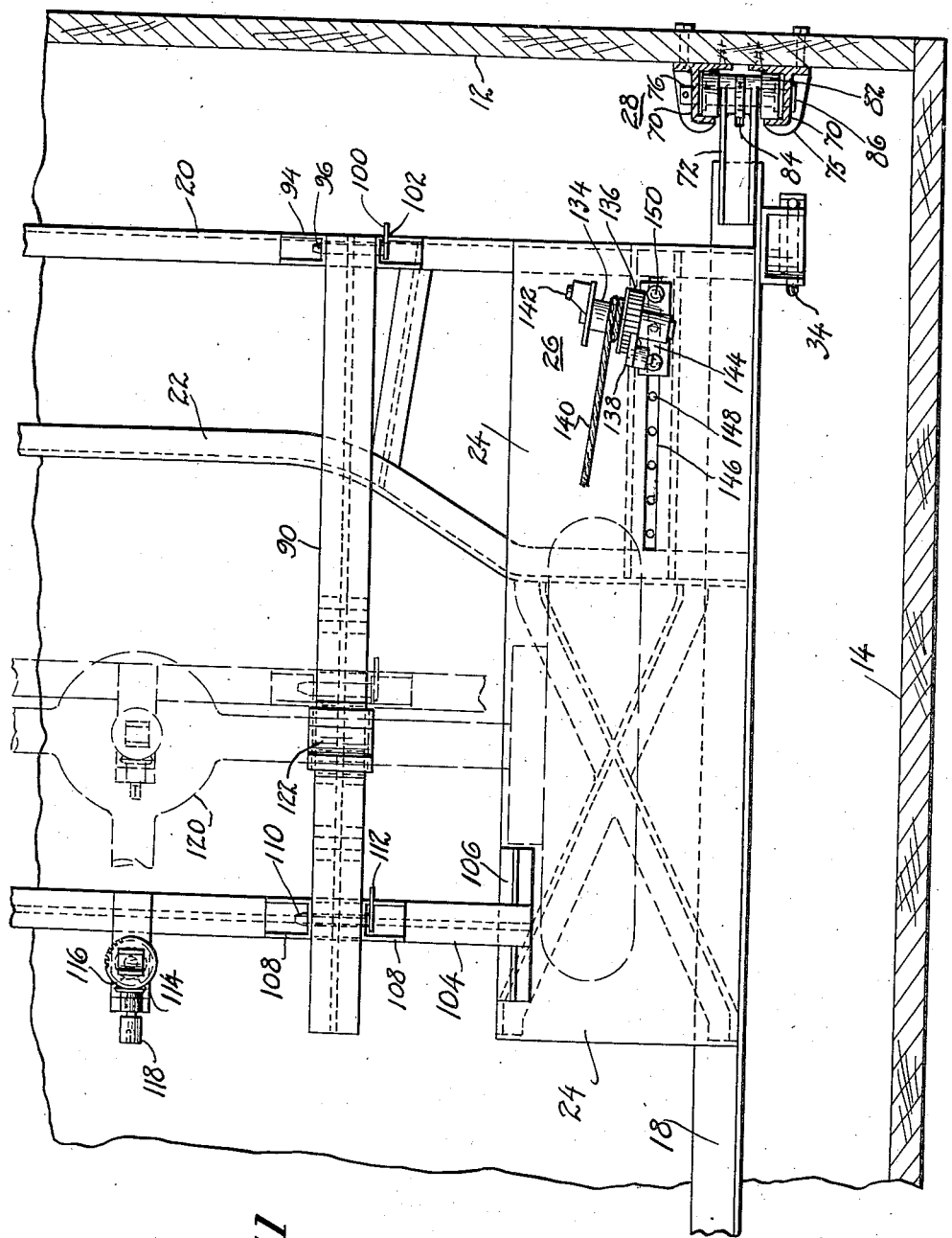

Nov. 22, 1938.  W. J. NIGHTINGALE  2,137,981
AUTOMOBILE LOADING DEVICE
Filed Feb. 29, 1936   6 Sheets-Sheet 5
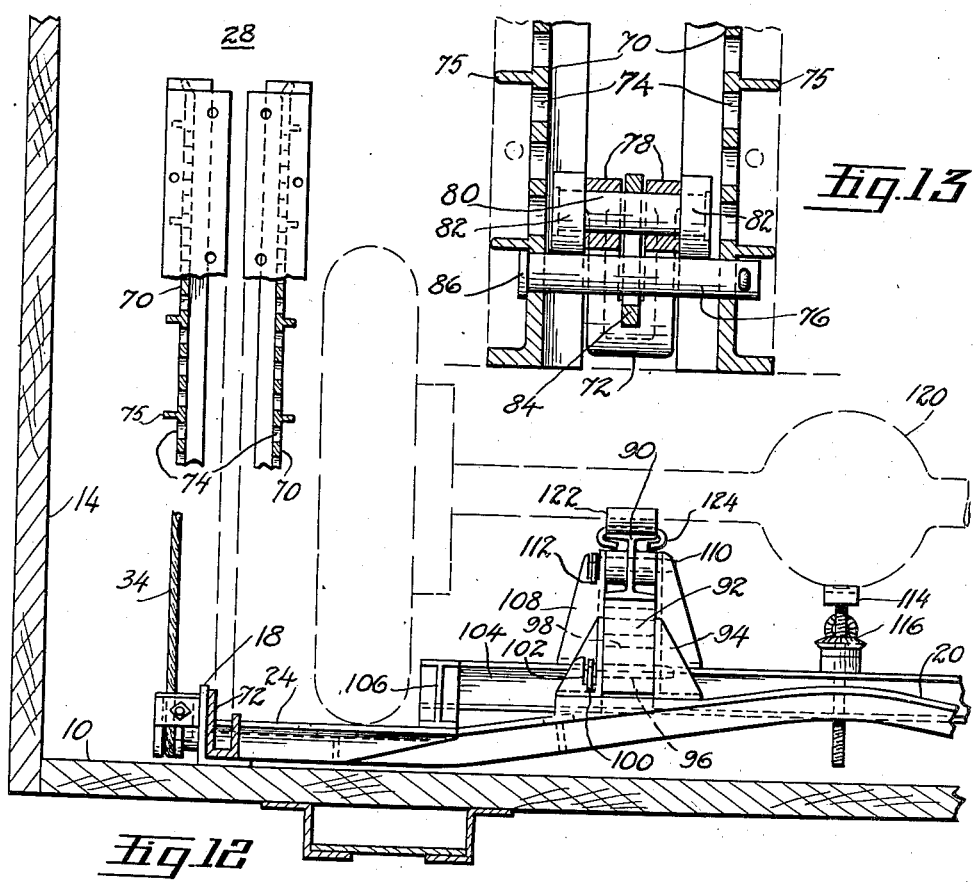
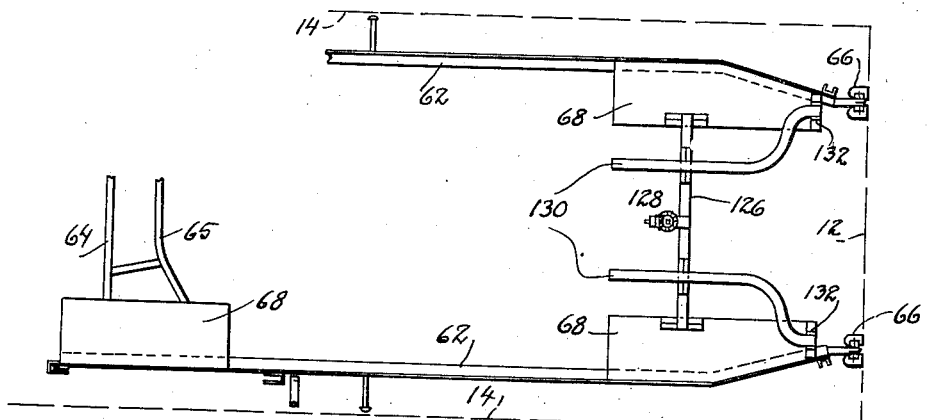
INVENTOR.
William J. Nightingale
BY
Parker & Burton
ATTORNEYS.

Nov. 22, 1938.    W. J. NIGHTINGALE    2,137,981
AUTOMOBILE LOADING DEVICE
Filed Feb. 29, 1936    6 Sheets—Sheet 6
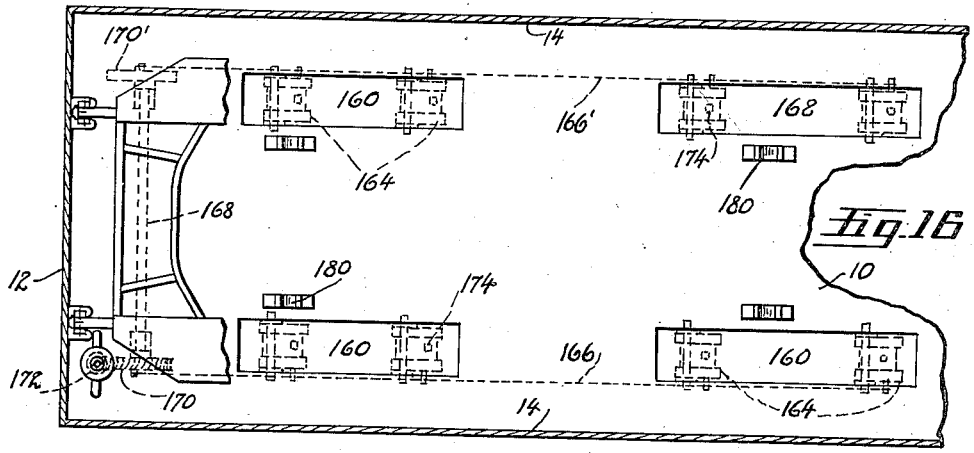
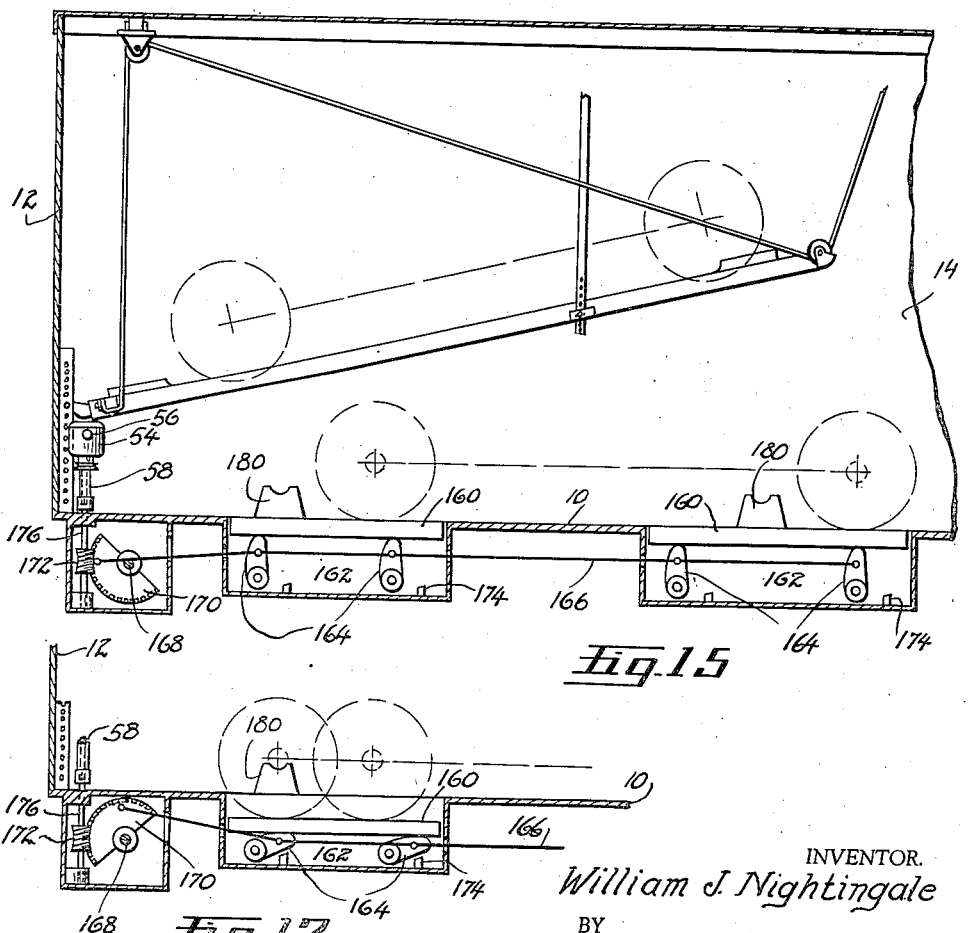
INVENTOR.
William J. Nightingale
BY
Parker & Burton
ATTORNEYS.

Patented Nov. 22, 1938

2,137,981

UNITED STATES PATENT OFFICE 2,137,981

AUTOMOBILE LOADING DEVICE

William J. Nightingale, Flint, Mich., assignor to Carl W. Bonbright, trustee, Flint, Mich.

Application February 29, 1936, Serial No. 66,373

16 Claims. (Cl. 105—368)

This invention relates to an improved method and apparatus for shipping automobiles compactly and economically in large transporting vehicles such as railway freight cars.

In the past attempts have been made to crowd several automobiles into the limited space of railway freight cars by raising and inclining certain of the automobiles loaded therein to provide sufficient space for receiving other automobiles. In actual practice these devices, although succeeding in getting more automobiles in a freight car than the limited space of the floor of the freight car could normally hold, required considerable time and labor to load and unload. A large number of men were required to maneuver the automobiles into and out of the freight car, load and raise the automobiles upon the elevating apparatus, and to operate all the necessary controls. All this took time and expense, important factors when big shipments were necessary.

Other disadvantages arose from the use of the devices employed in the past. The elevating or decking frames used for raising the automobiles to inclined position in the freight cars were large, cumbersome and expensive to manufacture and were so constructed and disposed within the freight cars that they failed to take the greatest advantage of the limited space afforded by the freight car. In certain cases, particularly when automobiles of long wheel bases were shipped, the freight car could only take three or even less than three automobiles instead of the usual and desired quota of four.

An important object of this invention is to provide an improved apparatus and mode of operation which reduces the amount of labor required and the time consumed in loading and unloading automobiles in a freight car. In addition the invention provides improvements which assist materially in securing automobiles in position in the freght car and in preventing the automobiles from being damaged either in transit or during the loading and unloading operations.

Another important object of this invention is to provide a novel decking device for raising and inclining automobiles in the freight car. The decking device is designed to accommodate all kinds and sizes of automobiles and to provide plenty of clearance when raised to inclined position for receiving all types of automobiles therebeneath. All parts of the decking device are constructed and arranged to provide a maximum amount of space therebeneath for receiving another automobile, and insuring plenty of space at the other end of the freight car for likewise accommodating two automobiles of any type or length. One such embodiment of the invention is a U-shaped decking frame adapted to support an automobile in inclined position and while in such position permit a second automobile to be advanced beneath the decking frame until it contacts the end wall of the freight car.

Another object of this invention is to provide novel supporting structures or "axle bucks" for relieving the road wheels and bearings of an automobile of the load of the automobile while in transit in a freight car. These devices are mounted for optional use and may be employed both on the decking frames and upon the freight car floor. In certain instances, the jolting and shaking to which the automobiles are subjected to in their passage does permanent damage to the bearings and other parts of the vehicles. Certain types of bearings particularly those associated with the wheels are susceptible of damage by the jolting movements of the freight car. The jolts and shocks incurred in transit are very likely to cause permanent damage to the bearing structures by producing indentations or cavities in the bearing raceways. This invention provides axle supports or "axle bucks", a term they are commonly called, which support the axle and relieve the bearings and road wheels of the load of the vehicle. These axle supports are arranged in an adjustable manner on the decking frames and upon the floor of the freight car.

A still further object of this invention is to provide improved devices for securing or holding the automobiles down upon their supports for the purpose of preventing them from jarring loose or swinging dangerously in transit. The securing devices or "hold downs" as they are generally termed are constructed in an improved manner for longitudinal adjustment which allows them to accommodate various sizes of automobiles.

An important object of this invention is to provide an improved easily operable apparatus associated with the floor of the freight car for lowering an automobile partially below the floor of the freight car. This feature of the invention operates in conjunction with the decking frames and permits higher and longer automobiles to be driven under the decking frames, while the latter are supporting automobiles. A meritorious feature of this provision is the novel mechanism for controlling four individual vertical adjustable, wheel engaging platforms from a single source. These platforms are positioned in the freight car floor corresponding to the four wheels of an automobile. By the novel mechanism, these platforms are lowered and raised in unison and from a single source of power. This mechanism includes elements linking all four of the platforms together for manual or power operation from a single source. When in non-use the platforms are adapted to extend flush with the floor of the freight car and form parts thereof.

Axle supports or "axle bucks" may cooperate with these platforms in a novel arrangement. They are adapted to relieve the wheel bearings of the weight of the automobile as the latter descends with the platforms below the floor level.

In carrying out the invention, the decking frames are each pivotally and slidably connected to the end wall of the freight car. This increases the space for receiving automobiles and provides an adjustable but strong support for the decking frame. A meritorious feature of this provision resides in an improved mechanism for vertically indexing the pivotal connection of the decking frames to the end wall. By this arrangement a multiplicity of adjustments can be made to the decking frame for supporting all kinds of automobiles and providing space for receiving all kinds of automobiles therebeneath. Further, an important feature of the pivotal indexing is a novel bearing construction therefor which facilitates easy pivotal movements of the decking frame and yet strongly sustains the weight of the automobile against all jarring forces while in transit.

A meritorious feature of the invention resides in the adaption and employment of a single portable power driving unit for operating the mechanism for raising the decking frame and also for operating the mechanism for lowering and raising the wheel platforms in the floor of the freight car. The portable power device is provided with a novel coupling mechanism which may be operatively connected to the driving mechanism for either the decking frame or the floor platforms. When it is desired to raise or lower the decking frame, the portable device is coupled to the drive mechanism therefor. When it is desired to raise or lower an automobile by means of the floor lowering platforms, the same portable device is coupled with the drive therefor. This method economizes in the amount of equipment necessary, and by using a power unit for driving both of these apparatuses a saving in time and labor is made. In the embodiment of the invention illustrated herein the portable power unit takes the form of an electric motor having means on the end of the armature shaft adapted for coupling either to the elevating mechanism of the decking frame or to the elevating mechanism of the floor platforms. By this provision no physical effort upon the part of the operator is required other than to carry the device to one or the other elevating mechanism and couple the device thereto.

Figure 5:
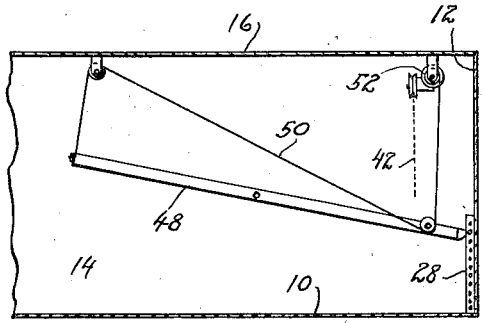
Figure 7:
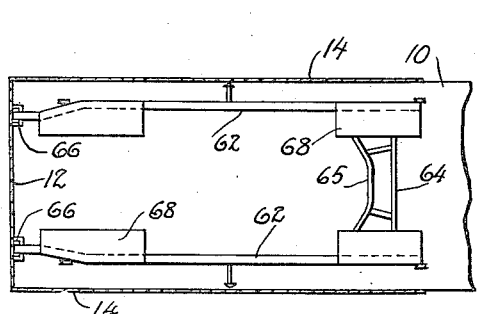
Figure 6:
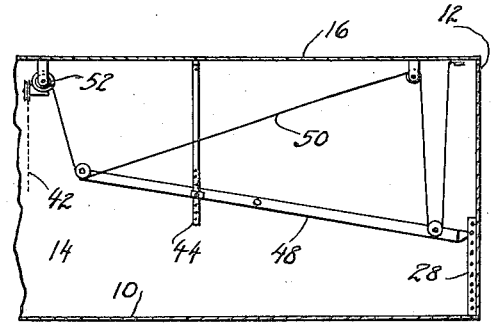
Figure 3:
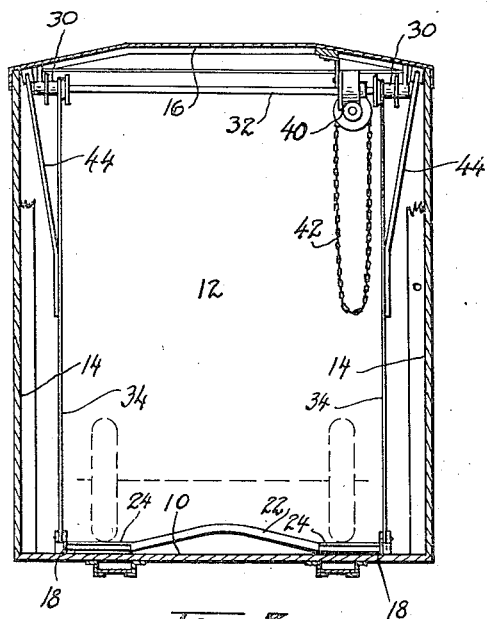
Figure 8:
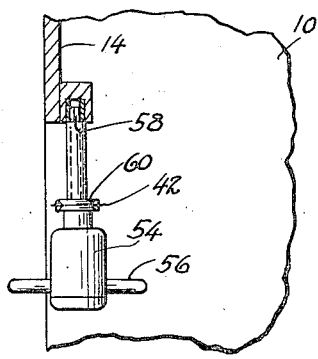

Various other objects, advantages and meritorious features of the invention will appear more fully from the following specification, claims and the accompanying drawings wherein:

Fig. 1 is a side view of a decking frame mounted within a freight car showing two positions assumed in the operation of loading automobiles, Fig. 2 is a top view of a decking frame mounted within a freight car taken along line 2—2 in Fig. 1, Fig. 3 is an end view through the freight car along line 3—3 in Fig. 1 showing the mechanism for elevating the decking frame, Fig. 4 shows a modified elevating system for raising and lowering the decking frame, Fig. 5 shows another modified elevating system for raising and lowering the decking frame, Fig. 6 shows a further modified elevating system for raising and lowering the decking frame, Fig. 7 is a top view of an improved U-shaped construction for a decking frame mounted within a freight car, Fig. 8 is a detail view of a portable electric device in position for operating the hoisting mechanism of a decking frame taken along line 8—8 of Fig. 1, Fig. 9 is a cross-sectional view of the pivotal end of the decking frame taken along 9—9 in Fig. 2 showing the manner of adjustably pivoting the decking frame to the end wall of the freight car and the manner of supporting the axles of the automobile by supports carried by the decking frame, Fig. 10 is a detail view showing the axle supports in demountable position, Fig. 11 is a top view of one corner of the decking frame showing a part of the axle support assembly and the adjustable character of an automobile lashing device, Fig. 12 is a cross-sectional view of the decking frame showing the axle support construction and a part of the vertical channel guide for indexing the decking frame to the end wall of the freight car, Fig. 13 is a detail view of the pivotal connection between the decking frame and an end wall of the freight car, Fig. 14 is a top view showing the adaption of the axle supporting device to a U-shaped decking frame, Fig. 15 is a side view of a modification of the invention showing a device for lowering an automobile partially below the level of the freight car, Fig. 16 is a top view of the floor of the freight car with the decking frame partially cut away to show the disposition of the lowering platforms and the manner of operating all the platforms from a single source, Fig. 17 is a detail view showing a platform in depressed position and the manner of lowering an automobile thereby.

In the embodiment of the invention illustrated in Figs. 1-3 reference numeral 10 indicates the floor of a large transporting vehicle such as a railway freight box car. As in the usual construction, the box car is provided with side walls, end walls and a roof. Each of the side walls open centrally of the freight car and sliding doors are adapted to close these openings in the conventional manner. An end wall of the freight car is shown at 12. The side walls are indicated at 14—14, and the top at 16. Extending longitudinally within the freight car between the side walls are two decking frames for raising and inclining automobiles within the freight car. One only of these decking frames will be shown and described since the other is a duplicate.

The decking frame illustrated in Figs. 1-3 is of general rectangular shape as shown in Fig. 2 and comprises a pair of spaced side members or bars 18—18 and a pair of end cross members 20—20. Auxiliary cross members 22—22 are provided adjacent to the end cross members. The auxiliary cross members are curved or bellied outwardly toward the ends of the decking frame as shown in Fig. 2. Both the end cross members and the auxiliary cross members are bowed upwardly or crowned as shown in Fig. 3. As it will become more apparent in later descriptions, the purpose of bellying and crowning the cross members is to provide as much space as possible within and under the decking frame in order to accommodate all sizes and makes of automobiles under the decking frame and upon the decking frame when the latter is in raised inclined position. The road wheels of the automobiles are shown in dotted outline in Figs. 1, 2 and 3.

In each corner of the decking frame are platforms or plates 24 each adapted to receive a wheel of an automobile as indicated in Fig. 2. Means for lashing the automobile securely to the decking frame may consist of four spaced winding drums 26 about each of which one end of a cable may be wound, the other end of the cable being attached to the automobile and tensioned to hold the same in place on the decking frame. The cables are shown in Fig. 11 and their operation as well as the structure of the lashing devices will be more fully described in connection with this figure.

The end of the decking frame adjacent to the end wall of the freight car is provided with a pair of extensions which slidably and pivotally engage in a pair of vertical channel guides 28. As will be described in more detail hereinafter the extensions may be secured in a plurality of positions along the guides, the dotted position of the decking frame in Fig. 1 representing one of these positions.

Mechanism for elevating the decking frame comprises a pair of cable systems one along each side of the decking frame. These systems include two flexible elements or cables 34 which are attached to opposite sides of the decking frame. Each cable 34 is adapted to be wound around a winding drum 30 secured to shaft 32 (see Fig. 3). The cables are run under sheaves or pulleys 36 on the decking frame and over sheaves or pulleys 38 secured to the ceiling above the pivotal end of the decking frame. From thence each cable runs to the end of the decking frame therebelow and is attached in any suitable manner thereto, such as by drawing it around an arched surface on the decking frame and attaching it thereto as shown in detail in Figs. 9 and 12.

Mechanism for operating the cable systems comprises a chain hoisting apparatus 40 operatively coupled with shaft 32. Chain 42 drives the apparatus in the conventional manner. It is apparent that the hoisting apparatus is capable of shortening the length of the cables 34, and compelling the decking frame to rise in the freight car. A pair of vertical supporting braces 44 depending from the ceiling may be connected to the decking frame to assist in holding the same against movements while in raised position. The side braces 46 on the decking frame may be employed for the purpose of preventing side sway between the walls of the freight car.

In Figs. 4, 5 and 6 there are shown three different cable systems for raising and lowering the decking frames. The decking frames are indicated at 48, the cables at 50, and the winding drums at 52. The system in Fig. 6 differs from that shown in Fig. 1 by the provision of a second sheave adjacent to the pivotal end of the decking frame about which the cable is looped and returned to the ceiling for attachment thereto. In Figs. 4 and 5 the winding drum is attached to the ceiling adjacent the end wall of the freight car. Fig. 5 in this sense is a reversal of the system shown in Figs. 1–3. Fig. 4 is a reversal of that shown in Fig. 6.

Mechanism for operating the hoisting mechanism is shown in Fig. 8. It comprises a portable electric device 54 having lateral extending handles 56 which are gripped by the operator. The device is passed through the loops of the chain 42 and supported in horizontal position by fitting the end of the drive shaft 58 into a hole specially provided for that purpose in one of the door jambs on the freight car. The chain 42 is fitted into a grooved wheel 60 and driven upon energization of the motor.

A modification of the decking device is shown in Fig. 7. The general form of the modification is U-shaped in contradistinction to the rectangular formation of the previous described decking frame. The side bars of the modified decking frame are indicated at 62. A pair of cross members 64 and 65, the inner one of which is curved outwardly, join the free ends of the side bars and form the base of the U. The other ends of the side bars are each slidable and pivotally received in each of a pair of vertical channel guides 66 which may be the same as that provided for the decking frame in Fig. 1. Platforms 68 carried on the decking device support the wheels of an automobile. By providing a U-shaped decking frame of this character and connecting it to the end wall of the freight car, it is possible while the frame supports an automobile in inclined position to drive the front end of another automobile so far under the decking frame that it will contact the end wall of the freight car. No interfering cross members are provided at the pivotal end of the frame to obstruct the advance of the automobile. The hood of the automobile advances between the side bars of the decking frame as the front end of the automobile advances toward the end wall of the freight car. By this provision two automobiles of any size may be accommodated at one end of the freight car and at the same time provide plenty of room at the other end of the freight car for loading and storing two automobiles of any size.

The channel guide assemblies for indexing the pivoted end of the decking frame will now be described. These devices are shown in detail in Figs. 9 and 11–13. Each device comprises a pair of parallel, vertical extending channel shaped members 70 spaced slightly from one another and secured to the end wall of the freight car. These channel shaped members face toward one another as shown in Fig. 11. In this manner they form a guide rail between which is fitted a part or extension 72 of the decking frame. Each channel shaped member 70 is provided with a plurality of vertically spaced, aligned apertures 74 through which a bolt 76 may extend and secure the end parts 72 of the decking frame in fixed pivotal position in the channel guide. This will be described in more detail hereinafter. Each channel shaped member is provided with a plurality of reinforcing ribs 75 which strengthen the walls of the channel members.

Referring in more detail to Fig. 13, the extension 72 on the decking frame is split into two spaced parts or trunnions 78—78 and each part is received in the space between the channel shaped members 70—70. The trunnions are provided with aligned apertures through which a pin 80 extends. This pin extends beyond the trunnions and carries rollers 82 on either end. These rollers bear upon the under sides of the channel shaped members and form the slidable and pivotal coupling for the end of the decking frame. Depending from the pin 80 in the space provided between the trunnions is an annular-shaped member or ring 84 of general pear shape formation as viewed from the side in Fig. 9. This formation is to provide room for easy insertion of bolt 76 through any of the aligned apertures 74 and the ring 84. When the bolt has been inserted as described, the ring 84, embracing the bolt 76 and the pin 80, restrains the latter from movement and prevents further slidable movement of the decking frame in the channel guides. When the hoisting apparatus and the cables are slackened slightly the rollers 82 will fall and bear upon the bolt 76 providing a rolling contact about which the decking frame may pivot. This is apparent from the position shown in Fig. 13.

Locking bolt 76 is provided with a head 86 which prevents the bolt from passing entirely through the aperture 74. The other end of the bolt may be shaped to receive any suitable means for releasably locking the bolt in position. Such a means may take the form of a cotter pin or similar device which may be received in an aperture on the end of the bolt for that purpose. Instead, however, the bolt may be locked in position on the head side of the bolt by providing aligned holes in the reinforcing ribs 75 on that side of the channel shaped members through which the bolt is to be inserted. After the insertion of the bolt, an elongated member or rod may be dropped through these aligned apertures and extend over the head 86 of the bolt in whatever position it may take along the channel guide. In this way the bolt will be locked against removal until the rod is withdrawn from the aligned apertures in the reinforcing ribs.

The decking frame may be supplied with axle supports or "axle bucks" as they are commonly called for supporting the load of the automobile and relieving the bearings of the road wheels of this function. By this provision all, or the major part of the automobile weight is taken from the wheels and placed on the axle supports thus preventing the bearings in the wheels from wearing or brinelling. If no provision were made for relieving the bearings of the load of the automobile, the excessive jolting of the freight car would cause the harder metal of the bearings to indent their respective raceways. This is accentuated because the wheels are not turning around when the jolts and shocks are transmitted to the bearings. The damage to the bearing raceways is similar to the action taking place during a Brinell test and for that reason it has been termed "brinelling".

The axle supporting devices are shown in detail in Figs. 9, 10, 11, 12 and 14. Two sets of these devices are mounted on a decking frame, one for the front axle and the other for the rear axle of the automobile. Each set is a duplicate of the other and for this reason only one of such sets is illustrated and described. The illustrated set is shown mounted on the decking frame adjacent its pivotal connection to the end wall of the freight car and is adapted to support the rear axle of the automobile. It is understood that the front axle may be supported by a similarly constructed and operated device.

The axle supporting devices comprise a pair of longitudinal members or bars 90 extending parallel to the side rails 18 of the decking frame but spaced inwardly thereof so as to support the axle of the automobile between the wheels and the center of the axle. The general position assumed by these bars is shown in dotted outline in Fig. 2. Since the bars 90 are duplicates of one another, only one is illustrated in detail. Each bar 90 is I-shaped in cross section and each is provided with a series of spaced apertures 91 in the vertical element of the I bar. Each aperture is buttressed around by a circular wall formation which extends outwardly on each side of the vertical element as far as the top and bottom horizontal elements of the I-bar as is clearly shown in Fig. 12. A member 92 is welded or otherwise fixedly secured to one end of the I-bar 90 and is adapted to extend between two upstanding supports or brackets 94 mounted on the end cross member 20.

An aperture is provided in each bracket 94 aligning with that in the other. Member 92 is provided with a series of vertically spaced apertures 98 each of which may be brought into alignment with the two in the brackets. A bolt 96 is adapted to be inserted through the aligned apertures in the brackets and through any one of the apertures 98 to pivotally secure the I-bar 90 to the brackets. The cross member 20 is recessed below member 92 and allows the same to be shifted vertically to present anyone of the apertures 98 opposite those in the brackets 94. This allows for vertical adjustment. Each bracket is reinforced by a pair of parallel triangular ribs extending laterally therefrom. One of these ribs is provided with a vertical slot 102. The bolt 96 has an arm 100 which is adapted to be turned into the slot and lock the bolt in position. The locked position is shown in the drawings. To withdraw the bolt, the arm is swung in a counter clockwise direction from out of the slot 102. The function of the bolt is to form an adjustable pivot for the I bar 90 in order that the bar may be swung from inoperative position to operative position as a comparison of Figs. 9 and 10 will indicate. The former indicates the operating position assumed by the bar when it supports the axle of the automobile.

The other end of I bar 90 is adapted to be supported in raised position by a brace 104 extending crosswise to the decking frame and spanning the distance between opposite wheel plates 24. The position assumed in relation to the whole decking frame is shown in dotted lines in Fig. 2. Brace 104 is shown as of the same I bar construction as the longitudinally extending I bar 90. This brace is provided with widened extremities or legs 106 which rest on plates 24 thereby enabling the brace to be picked up and adjusted longitudinally on the plates. Welded or otherwise fixedly secured near each end of the brace member 104 is a pair of upstanding brackets 108 of similar construction to the brackets 94 previously described. The I bar 90 is adapted to swing between these brackets and to be secured thereto by a bolt 110 similar in construction to bolt 96. The bolt is adapted to extend through any one of the series of apertures 91 formed in I bar 90. When this has been done, the I bar 90 is supported in horizontal position shown in Fig. 9. Bolt 110 may be provided with an arm 112 for locking the bolt against removal in the same manner as bolt 96. It is obvious that brace 104 may be shifted along the wheel plates 24 to present the bolt 110 opposite any of the apertures 91.

Secured to the cross brace 104 intermediate its ends is a jack 114 having a bevel gear drive 116. A crank may be connected to the coupling unit 118 for raising and lowering the jack. The jack is adapted to engage any convenient under-part of the automobile. As shown in the drawings it is arranged to engage the rear end housing 120 of an automobile. A similar type of jack is associated with the axle supporting devices arranged to support the front end of the automobile carried by the decking frame.

A block 122 is slidably fitted on the top element of the I bar 90, the depending flanges 124 of the block being curled about the edge of the element for a slidable fit as best shown in Fig. 12. The top of the block is recessed for receiving the axle of the automobile as indicated in Fig. 9.

The axle supporting devices furnished at each end of the decking device are constructed for optional use. If their presence is not necessary, they may be entirely dismounted by withdrawing the two bolts 96 and 110 and removing the longitudinal I bars 90 and the transverse braces 104 including the parts carried thereby. Or the braces alone may be removed while the I bars 90 are retained. These may be swung about their pivotal connection to the brackets 94 and leaned up against the end wall of the freight car where they will be out of the way.

The construction of the axle supports for a U-shaped decking frame is shown in Fig. 14. The construction of the transversely extending brace member 126 including the jack 128 is the same as the construction 104 described in the preceding figures. The longitudinal axle supporting members 130 are similar to the I bar structures 90 described above except that the ends of the members adjacent the end walls of the freight car are curved outwardly and pivotally connected between brackets 132 mounted on the wheel plates 68. Brackets 132 are similar to brackets 94 except that they are secured to the wheel plates rather than to a cross member.

The lashing devices 26 are mounted on the wheel plates 24 for longitudinal adjustment in order to hold down different sizes of automobiles to the decking frame. The devices are shown in detail in Figs. 9, 10 and 11 and comprise a winding drum 134 having a gear 136 and a pawl 138 for permitting rotation of the drum in one direction while it locks it against return movement. The drum carries a flexible element or cable 140 wound therearound. The other end of the cable may be connected to the automobile which is supported on the decking frame, preferably connected to the chassis frame by any suitable means. When the cable is tensioned by the winding drum, the automobile is lashed to the decking frame. The drum may be operated by a suitable crank arm engageable with the coupling unit 142. As shown, the drum faces at an oblique angle to the decking frame so that the tension of the cable is directed both longitudinally and transversely of the automobile.

The base 144 of the lashing device is slidably interfitted with a channel 146 formed on the wheel plate 24. A similar provision is made upon the opposite plate for adjusting the lashing device connected thereto. The base of the channel is provided with a series of apertures 148 through which studs 150 on the base 144 may extend and hold the lashing device in fixed position in the channel. Adjustment is thereby provided for accommodating automobiles of various sizes in the decking frame.

An important feature of the invention cooperates with the decking frames to allow larger and longer automobiles to be carried thereby. This feature relates to the provision for lowering automobiles partially below the level of the freight car floor. This lowering device may be operated from a single mechanism stationed in readily accessible positions in the freight car. The mechanism in turn can be power operated by the same electric motor unit (see Fig. 8) which raises and lowers the decking frame.

This feature is shown in detail in Figs. 15, 16 and 17. It has been omitted from the earlier figures for the sake of clarity. The feature comprises four platforms 160 spaced about one end of the freight car floor to receive the four wheels of an automobile. Below each platform is a recess 162 in the car floor in which is provided mechanism for raising and lowering the platforms. This mechanism comprises a pair of cam devices 164 which bear upon the under surface of each platform. Each cam device actually comprises a pair of spaced cam elements as shown by the dotted structure in Fig. 16. The cam devices in each recess are coupled together and with those in the adjoining recesses by a system of tension transmitting members or rod linkages. A linkage system is provided for each pair of recesses on each side of the freight car. The rod linkage for one side is designated as 166 and that for the other as 166'. These rod linkages operate all the cam devices together and cause all the platforms to be raised and lowered in unison.

Extending transversely of the freight car below the floor is a shaft 168 upon each end of which is provided a semi-circular element. These elements are designated by reference numerals 170 and 170' and rod systems 166 and 166' are respectively pivotally connected to these elements in the manner indicated in Fig. 16.

One of the elements is provided with teeth on its periphery to which is coupled a worm gear 172. Rotation of the worm gear effects swinging movement of the elements. This is transferred into reciprocal movements by the rod systems 166 and 166' which in turn work the cams and elevate and depress the platforms. On the base of each recess 162 are provided studs or pegs 174 which are adapted to engage the cams in this lowermost position and assist in supporting the platforms as shown in Fig. 17.

Worm gear 172 is fixed to a vertical shaft 176 which extends upwardly through the floor of the freight car. The end of the shaft is shaped for coupling with the extremity of the driving shaft on the motor unit illustrated in Fig. 8. By this provision the platforms may be raised and lowered without physical effort. However, a crank may be adapted for engagement with the end of shaft 176 for turning the same in place of the power device.

The platform arrangement may be duplicated in the floor of the freight car at the other end thereof. It is possible that both of these platform arrangements may be operated from mechanism located centrally within the freight car. In such a case two automobiles may be raised and lowered at once in the freight car. However, a single centrally located mechanism in the freight car may be employed for operating both platform systems separately, that is, by coupling first one and then the other to the mechanism.

Blocks 180 may be provided for carrying the load of the automobiles while they are depressed below the floor of the freight car by the platforms 160. These blocks may be slid under the axles of the automobiles as they are lowered. The blocks are recessed on the top surfaces similarly to axle blocks 122 for engagement with the axles. A pair of such blocks are positioned between each set of platforms as shown in Fig. 16. They engage the axles of the automobiles as the latter are lowered by the platforms and relieve the weight of the automobile from its road wheels and bearings. This will prevent wear or brinelling of the bearings which is likely to be caused by the jolting movement of the freight car while in transit.

The operation of the decking frames and their associated devices including the lowering platforms will now be described. The operation of one decking frame will mainly be described since the operation of the other decking frame is similar. A decking frame in the freight car is lowered until it rests upon the car floor as shown in Fig. 1. An automobile is rolled into the freight car through one of the side doors and backed upon the decking frame until all four wheels are placed on the plates 24. The axle supporting devices, if these are intended to be used, have in the meantime been lowered to inoperative position as shown in Fig. 10. The transversely extending braces 104 are now adjusted on the wheel plates until the jacks are below those parts of the automobile which they will engage and lift. In the illustrated axle supporting structure, the transversely extending brace 104 is adjusted until the jack is disposed below the rear end housing of the automobile. The jack in each axle support is now operated until the axles of the automobiles are raised high enough for the I bars 90 to be swung from inoperative position to horizontal operating position shown in Fig. 9. As this is being done the axle blocks 122 are slid along the I bars 90 so that they will engage the axles when the lifting action of the jacks is lessened a little. Bolts 110 are now thrust through the apertures in the brackets 108 and one of the apertures 91 in the I bar to lock the I bar in horizontal position. When this operation has occurred, the jacks are lowered allowing the axles to descend upon the blocks 122 and be supported thereby.

The automobile is now lashed to the decking frame by securing the cables 140 to the automobile chassis frame and tensioned by the winding drums. When all four of the lashing devices have been connected to the automobile, the automobile is held down upon the decking frame and restrained from both lateral and longitudinal movement thereupon. The oblique direction of the cables 140 assists materially in this accomplishment.

The front or free end of the decking frame is now temporarily held to the car floor while the pivoted end is adjusted in the channel guides 28. In accomplishing this, the free end of the decking frame may be lashed to the floor by any suitable means, such as a hook normally disposed in a box below the car floor, but removable for attachment to the free end of the decking frame. The portable motor unit 54 is now passed partially through the loop in the chain 42 and inserted in the hole provided in the door joint of the freight car for supporting the unit. Having secured the chain in proper driving position about the grooved wheel 60, the motor is started and the hoisting apparatus functions to raise the end of the decking frame adjacent the end wall up through the channel guides 28. The hoisting apparatus will not raise the other end of the decking frame since this is held to the floor by any suitable means as previously described. This raising movement is concluded when the trunnions 78 appear opposite those apertures 74 in the guides which will provide a maximum amount of space below the decking frame when the other end of the frame is raised. This indexing operation is determined by the size and length of the automobile hoisted by the decking frames. Generally, for smaller cars, the pivoted end of the decking frame may be indexed to a higher position in the channel guides 28. The reverse is generally true for larger automobiles.

Bolts 76 are now inserted through one of the apertures 74 in the channel guides 28 and through the ring 84. Since the ring embraces both the pin 80 and the bolt 76, this end of the decking frame is locked against further vertical movement but is permitted pivoted movement about its connection to the end wall of the freight car.

The other end of the decking frame is now freed from its connection to the floor and the motor unit 54 is restarted. The hoisting apparatus now functions to raise the free or forward end of the decking frame in a swinging movement about the pivotal connection to the end wall of the freight car. It may be raised to an inclined position such as that shown in Fig. 1. Side wall braces 44 may now be attached to the decking frame to secure the same in inclined position.

The other decking frame in the other end of the freight car may be similarly loaded and raised to inclined position.

A third automobile is rolled into the freight car and advanced frontwardly as far as it will go under one of the raised decking frames. In the case of the U-shaped frame it is possible to advance this automobile under the raised deck until it strikes the end wall of the freight car. After the third automobile has been positioned in this manner, a fourth automobile is rolled into the freight car and advanced frontwardly under the other decking frame. The freight car now contains four automobiles, two in inclined position and two in horizontal position on the floor. The wide expanse between the side and cross members of the decking frames, and the bellied and crowned formation of the cross members, provide sufficient clearance whereby the freight car can hold four automobiles of any standard make or size. The pivotal connection to the end wall and the indexing feature for this connection also provides fine adjustment so that all available space in the freight car may be used.

If lowering platforms are provided as illustrated in Figs. 15–17, the last two automobiles entering the freight car may be driven upon these platforms and lowered. The automobiles may be driven for a short way upon the platforms, lowered, and advanced a little further upon the platforms as indicated in dotted lines in Fig. 17. The platforms are raised and lowered by coupling the power unit 54 to the end of shaft 176. The provision of platforms of this character enables long and tall automobiles to be loaded both on the decking frames and below the decking frames. Even small trucks may be shipped either upon the decking frames or on the floor of the freight car.

When it is desired that the automobiles on the lowering platforms be supported free of their road wheels, axle blocks 180 may be used. They are judiciously shifted when the automobiles are lowered by the platforms so that the axles drop within the recesses formed on their top surfaces. If the platforms are now depressed a little further the axle blocks will take the load of the vehicle.

The description of the operation of loading the automobiles on the decking frames included the use of the axle supporting devices. If their use is not necessary they may be dispensed with by removing the bolts 96 and 110 and dismounting the apparatus. In this case the steps of loading the automobiles in the freight car will omit this operation.

Reference is made to the copending application for patent of Lawson H. Cooper, Serial No. 718,923, filed April 4, 1934, which includes a description of and claims relating to means for vertically guiding one end of the decking device in a transporting vehicle and for pivotally connecting the same thereto at a point spaced from the floor.

Reference is made to the copending application of William J. Nightingale, Serial No. 758,377, filed December 20, 1934, which includes a description of and claims relating to means for elevating the decking device and for supporting the same in elevated position.

Reference is also made to the copending application of Lawson H. Cooper and William J. Nightingale, Serial No. 194,892, filed March 9, 1938, and to the application of William J. Nightingale, Serial No. 758,378, filed December 20, 1934, which particularly describe and claim the construction of the cross frame members 20 and 22 and the wheel supporting portions 24 of the decking device.

Reference is also made to the patent to Lawson H. Cooper, No. 2,077,376, which contains a description of and claims relating to a floor well construction similar to that described herein and provided with movable wheel supporting platforms therein for raising and lowering an automobile.

What I claim:

1. In combination with a freight car having an automobile decking device therein, mechanism for adjustably securing one end of said device to an end wall of said freight car comprising a vertical channeled guideway secured to the end wall and having a vertical slot of less width than the channel of the guideway, said decking device having a part extending through said slot and provided with a laterally extending member carrying rollers adapted to bear upon the inner under surfaces of said channeled guideway, said guideway provided with a plurality of vertically spaced aligned holes, an annular shaped member carried by said part and depending therebelow to present an aperture opposite any one of said aligned holes in said guideway, and a bolt removably receivable through said holes and said annular shaped member adapted to bear against said rollers forming a bearing surface about which the rollers may roll to provide a fulcrum for pivoting said decking device to the end wall of the freight car.

2. An automobile loading device for shipping automobiles compactly in a freight car and for holding the automobiles against movement therein comprising, in combination, a decking frame for supporting an automobile in raised position in a freight car, said decking frame provided with a pair of plates at one end thereof for supporting one set of automobile wheels and a pair of plates adjacent the other end thereof for supporting the other set of automobile wheels, one pair of plates each provided with a longitudinally extending channeled guideway, a winding drum for each of said last mentioned pair of plates having means slidably engageable with the channeled guideways in their respective plates, fastening means for securing said drums in a plurality of fixed positions along their respective guideways, said winding drums mounted on an axis extending at an oblique angle to said guideways, flexible tensioning elements carried by said drums and adapted to be connected to the automobile supported upon said decking frame inwardly of the position of said drums upon the plates and be tensioned thereto by said drums, a pair of winding drums secured to the decking frame adjacent the pair of plates at the other end of the decking frame and likewise provided with flexible tensioning elements adapted to be connected with the automobile supported upon the decking frame, and means for holding said flexible elements in tensioned condition after the same have been connected to an automobile supported upon the decking frame.

3. In combination with a transporting vehicle having a floor, side walls and an end wall, an integral substantially U-shaped decking frame positioned adjacent said end wall with the open end thereof opening toward the end wall, said frame including side bars spaced sufficiently to receive a portion of an automobile body between them, means on the frame between the side bars and at one end thereof for supporting one set of the automobile wheels thereon, means between the other ends of the side bars for supporting the other set of wheels, the frame having a large central opening extending outwardly longitudinally between said supporting means at the ends of the frame, means for pivotally securing the open end of the U-shaped frame to the end wall of said transporting vehicle, and means for elevating the closed end of the U-shaped frame about its pivotal connection to the end wall.

4. In combination with a transporting vehicle having a floor, side walls and an end wall, an automobile decking frame positioned longitudinally within said vehicle between the side walls and adjacent the end wall thereof, said decking frame being substantially U-shaped in formation and having its open end opening toward the end wall, said frame including a pair of side bars and a transverse bar joining the ends of said bars remote from said end wall to form the closed end of the U, means on the frame between the side bars and at one end thereof for supporting one set of the automobile wheels thereon, means between the other ends of the side bars for supporting the other set of automobile wheels, the frame having a large central opening extending at each side longitudinally between said supporting means at the ends of the frame, a pair of vertical guides on said end wall, and means for coupling the extremities of said side bars to said guides in a plurality of positions therealong.

5. An automobile loading device for loading automobiles in compact condition in transporting vehicles comprising, in combination with a transporting vehicle having a floor, side walls and an end wall, a U-shaped frame being open between the arms of the U sufficiently to receive a portion of an automobile body therebetween, a pair of spaced parallel vertical guides secured to said end wall of the transporting vehicle, means for slidably coupling the extremity of the arms of the U-shaped frame to said guides, and means for securing said arms in fixed position at a plurality of points along said guides.

6. An automobile loading device for loading automobiles compactly together in a freight car comprising, in combination, a decking frame having means for supporting the wheels of an automobile, a vertical channel guide secured to an end wall of the freight car, means on one end of said decking frame extending into the channel of said guide and provided with a roller mechanism bearing upon an inner wall of the channel, said channel guide provided with a series of vertically spaced holes extending through a wall thereof, and a member insertable in any one of said holes and adapted to interlock with said means on the end of the decking frame to lock the same against vertical movement in said guide, said means and said member so arranged when interlocking engagement occurs that said roller mechanism is adapted to bear upon said member and roll thereover to provide a fulcrum.

7. In combination with a freight car having an automobile decking device therein, mechanism for adjustably securing one end of said device to an end wall of said freight car comprising a vertical channeled guideway having parallel side wall sections spaced from one another and bent toward one another at their outer extremities to form a vertical slot of narrower width than the channel formed thereby, said decking device having a part extending through said slot into the channel formed by said side wall sections, rollers on said part engaging the inner surfaces of said side wall sections of said guideway interlockingly securing the decking device to the channeled guideway and permitting relatively frictionless vertical adjustment of said part along said guideway, said guideway provided with a series of vertically spaced oppositely facing holes in the side walls thereof, and a member removably receivable through said holes and adapted to couple said part in fixed position in said guideway, said rollers adapted to bear upon said member when the latter is thus received in the holes of said guideway and roll thereupon as the decking device is pivoted relative to the end wall of the freight car.

8. An automobile loading device for shipping automobiles compactly together in a freight car comprising, in combination, a decking frame for supporting an automobile in raised position in the freight car, said decking frame provided with a pair of plates adjacent one end thereof for supporting one set of automobile wheels and a pair of plates adjacent the other end for supporting the other set of automobile wheels, one pair of plates each provided with a longitudinally extending channeled guideway, a winding drum for each guideway having an element engaging in its respective guideway and slidable therealong to provide a longitudinal adjustment of the winding drum, flexible means on each of said drums adapted to be connected to the automobile supported upon said decking frame and tensioned by said drums to hold the automobile in fixed position on the decking frame, means for releasably locking said drums against rotation to retain said flexible means in such tensioned condition, and means fo fixedly securing the elements of said winding drums in any one of a plurality of positions along said guideway to adjust the same to the size and type of automobile carried by said decking frame.

9. An automobile loading device for use in transporting vehicles comprising, in combination, a pair of spaced vertical guideways, a pair of members extending in spaced substantially parallel relationship each having an end slidably engaged in one of said guideways for vertical movement therealong, means at the opposite ends of said members connecting the same together and forming a substantially rigid frame of a general U-shaped formation, the space between said members being otherwise free of any other means connecting the two members together, means operatively associated with said guideways for locking the adjacent ends of said members against vertical movement at any one of a plurality of points therealong but permitting pivotal movement about any of such locking points, and means for raising and lowering the entire U-shaped frame or the closed end thereof if the guided ends of the frame are pivotally locked against vertical movement.

10. In combination with a transporting vehicle having a floor, side walls and an end wall, an automobile decking frame positioned longitudinally within said vehicle between the side walls and adjacent the end wall thereof, said decking frame being substantially U-shaped in formation and having its open end opening toward the end wall, said frame including a pair of side bars and a transverse bar joining the ends of said bars remote from said end wall to form the closed end of the U, means on the frame between the side bars and at one end thereof for supporting one set of the automobile wheels thereon, means between the other ends of the side bars for supporting the other set of automobile wheels, the frame having a large central opening extending at each side longitudinally between said supporting means at the ends of the frame, vertical guides on said end wall, slidingly receiving the extremities of said side bars, means for pivotally fastening said extremities to said guides at spaced points therealong, and means for elevating the closed end of said U-shaped frame about its pivotal connection to the guides in the end wall of the transporting vehicle.

11. In combination with a transporting vehicle having a floor and a wall rising therefrom, an automobile loading decking frame disposed in said transporting vehicle with one end thereof adjacent to the said wall, a vertical guide secured to said wall and having a vertically extending flange extending laterally from the wall, a part on the adjacent end of said decking frame slidingly coupled to said vertical guide, the flange of said guide provided with a plurality of vertically spaced apertures, a member removably insertable through said apertures and adapted when inserted in any one of said apertures to form a support upon which said part on the end of the frame may bear, and an element adapted to couple said part to said member to prevent the former from rising from its bearing support on the latter but adapted to allow the decking frame to swing about its support upon said member.

12. In combination with a transporting vehicle, having a floor and a wall rising therefrom, an automobile loading decking frame disposed in said transporting vehicle with one end thereof adjacent to said wall, a vertical roller guide secured to said wall having a vertically extending flange projecting laterally from the face of the wall and bent substantially parallel to the wall along its outer edge to form a roller guide between the wall and the bent edge of the flange, a part carried by said adjacent end of the decking frame extending past said bent edge of the flange and carrying a roller adapted to bear against the inner surface of the bent edge of said flange, said flange provided in its laterally projecting portion with a plurality of vertically spaced apertures, a bolt removably insertable through said apertures and adapted when inserted in one of said apertures to form a support upon which the roller of said part may bear, and an element carried by said part adapted to extend under said bolt when the part is supported upon the bolt to prevent the part from rising from its support on the bolt.

13. In a railway freight car having a floor, ceiling, spaced side walls and end walls, an automobile loading decking frame positioned in the freight car with an end adjacent an end wall thereof, elevating means for raising and lowering the decking frame in the freight car, means for slidingly guiding the end of the frame adjacent to said end wall in a vertical path along the end wall, means for forming an obstruction in the path of movement of the end of the frame in said guiding means, said obstructing means adapted to form a support upon which the guided end of said frame may be lowered to rest thereon while supporting an automobile, and means for supporting the other end of the frame in raised condition in the freight car, and means for coupling said obstructing means to the guided end of said frame to prevent the latter from raising above its support on said means.

14. In a transporting vehicle having a floor, side walls, an end wall and a ceiling spaced from the floor less than the combined height of two automobiles, a decking device for compactly loading automobiles therein comprising an open rectangular frame of a size substantially the area of the road engaging portions of an automobile formed of side supporting means and transverse supporting means connected together into the form of an open rectangle, said frame including automobile road wheel supporting means adjacent the opposite ends of the side members, means for raising said frame and an automobile loaded thereon, means for slidingly guiding one end of said frame in a vertical path along the end wall of the transporting vehicle, means for pivotally securing said guided end to the end wall at a plurality of vertically spaced points therealong, said last means acting to hold the guided end of the frame from further vertical movement but allowing the entire frame and an automobile loaded thereon to swing thereabout as a pivot, means for suspending the free end of the frame from the ceiling of the transporting vehicle, and means for adjustably securing the free end of the frame to said suspending means at a plurality of vertically spaced points, the ability to adjustably pivotally secure the guided end of the frame to the end wall at any one of a plurality of spaced points above the floor and to adjust the suspension of the free end of the frame to any one of a plurality of points spaced from the ceiling enabling the frame to be finely adjusted to a plurality of heights and inclinations in the vehicle so that irrespective of the type of automobile supported on the frame, the maximum amount of clearance may be provided thereunder to receive a floor supported automobile.

15. An automobile decking frame for supporting automobiles in transport comprising, in combination, a frame having wheel supporting means spaced in positions to receive the road wheels of an automobile and support the same thereon, means for elevating the decking frame and an automobile carried thereon, means for raising the road wheels at one end of the automobile relative to the road wheel supporting means therefor to relieve the road wheels at this end of the load of the automobile, said means comprising a member extending transversely of the frame having its opposite ends supported on the frame, a jack carried by said member adapted to engage the under carriage of one end of the automobile carried on the frame and raise the same and the road wheels at that end relative to the road wheel supporting means therefor, and means overlying said member and adapted to engage the axle of the end of the automobile after the same has been raised by said jack, means for adjustably supporting said axle engaging means on the decking frame at one point and upon the transverse member at another point.

16. An automobile decking frame for supporting automobiles in transport comprising, in combination, a frame having wheel supporting means spaced in positions to receive the road wheels of an automobile and support the same thereon, means for elevating the decking frame and an automobile carried thereon, means for raising the road wheels at one end of the automobile relative to the road wheel supporting means therefor to relieve the road wheels at this end of the load of the automobile, said means comprising a member extending transversely of the frame having its opposite ends supported on the frame, a jack carried by said member at substantially the mid point thereof adapted to engage the under carriage of one end of the automobile carried on the frame and raise the same and the road wheels at that end relative to the road wheel supporting means therefor, and a pair of members extending longitudinally of the frame on opposite sides of said jack but within the sides of the frame, said longitudinally extending members overlying said transversely extending member, means demountably securing said longitudinal members at one point to said transverse member for support thereon, means movably securing said longitudinal members at another point to the decking frame, and axle engaging means slidable along the top of said longitudinal means and adapted to engage the axle of the end of the automobile raised by said jack and carry the load thereof.

WILLIAM J. NIGHTINGALE.